United States Patent

Arve et al.

[15] 3,645,271
[45] Feb. 29, 1972

[54] MACHINE FOR CUTTING STEMS FROM LEGUME PODS

[72] Inventors: Harold R. Arve; William T. Queen, both of 25320 S.W. 108 Ave., Goulds, Fla. 33170

[22] Filed: Apr. 6, 1970

[21] Appl. No.: 25,652

[52] U.S. Cl............................................130/30 R, 146/1 R
[51] Int. Cl....................................A01d 55/22, A23n 15/00
[58] Field of Search..............................146/55, 1; 130/30 R

[56] References Cited

UNITED STATES PATENTS 3,059,648  10/1962  Burton..................................130/30 R
3,115,170  12/1963  Rodriquez et al..........................146/1

Primary Examiner—Willie G. Abercrombie
Attorney—Lloyd J. Andres

[57] ABSTRACT

An agricultural machine for continuously cutting the stems from legumes, such as the edible immature pods of pole and bush beans. The machine includes a power-rotated tilted drum for continuously conducting field-picked stem-retained pairs of beans fed into the high end thereof. The drum has internal hooks adapted to raise and drop the bean pairs straddling a cable conveyor which conducts the beans to a power cutter in the lower end of the drum for cutting the stems from the beans and gravitating the latter onto a conveyor for transport to a packing destination.

1 Claims, 11 Drawing Figures

INVENTORS
HAROLD R. ARVE
WILLIAM T. QUEEN
BY
Lloyd J Andrews

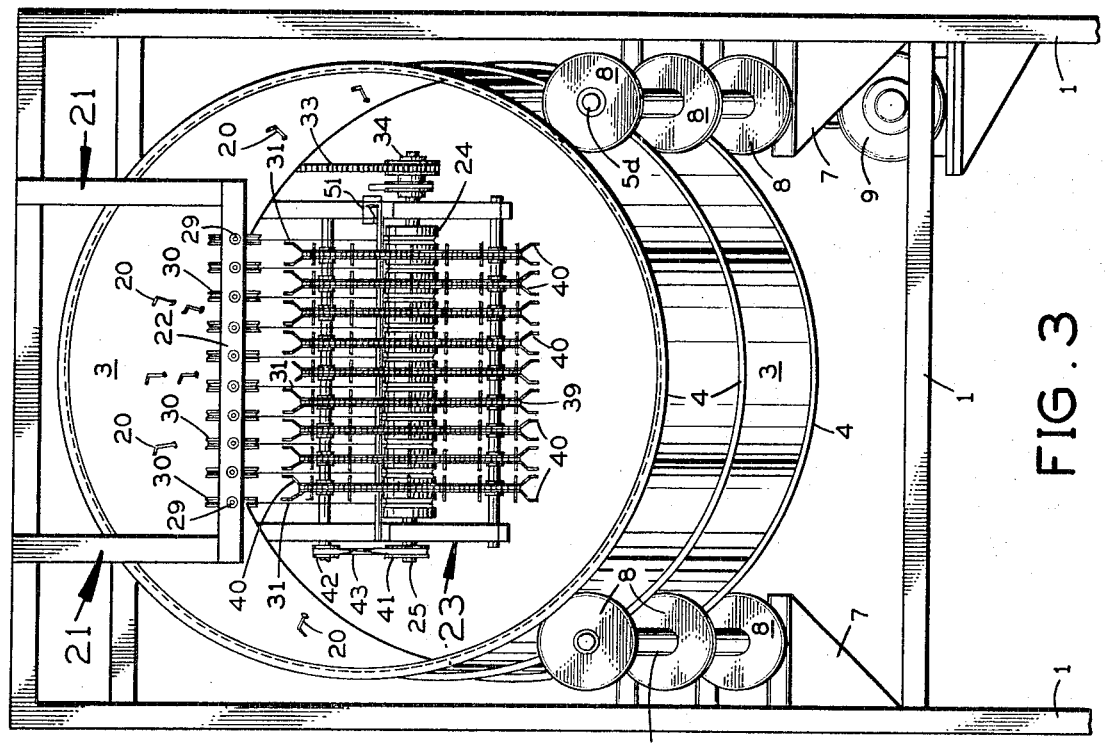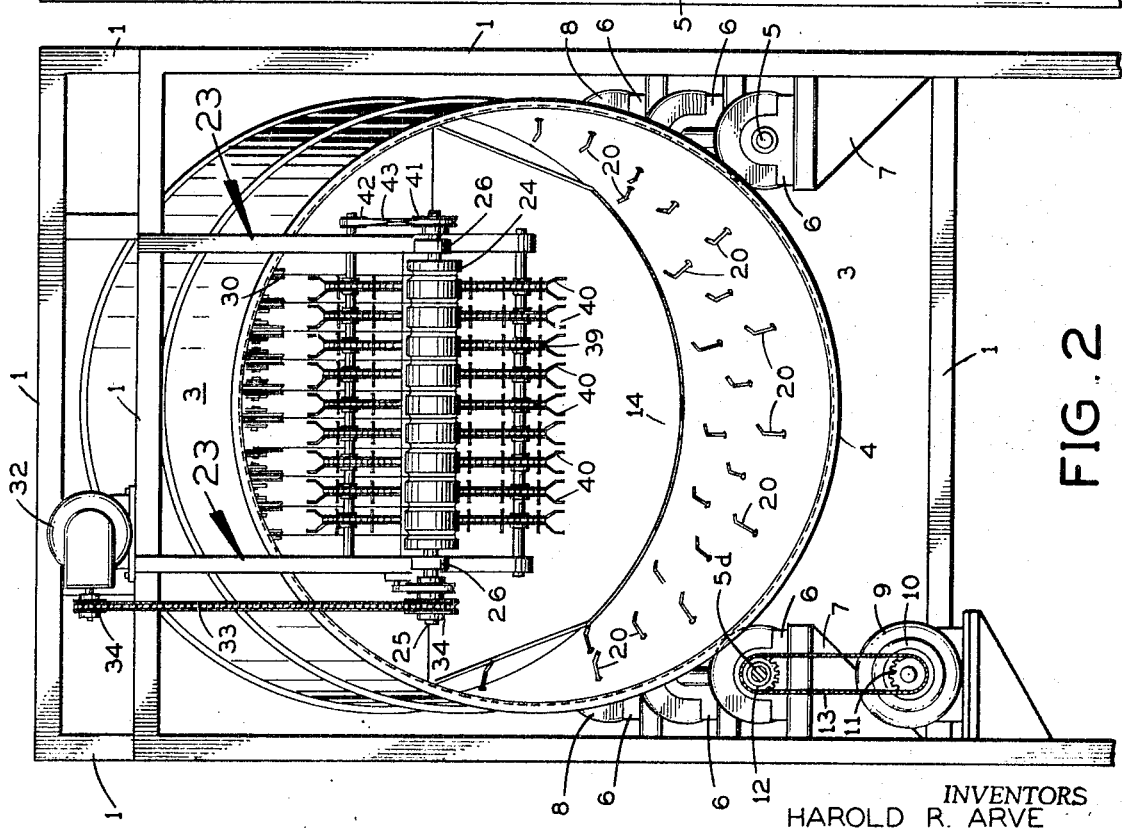

INVENTORS
HAROLD R. ARVE
WILLIAM T. QUEEN

INVENTORS
HAROLD R. ARVE
WILLIAM T. QUEEN
BY
Lloyd␣␣␣

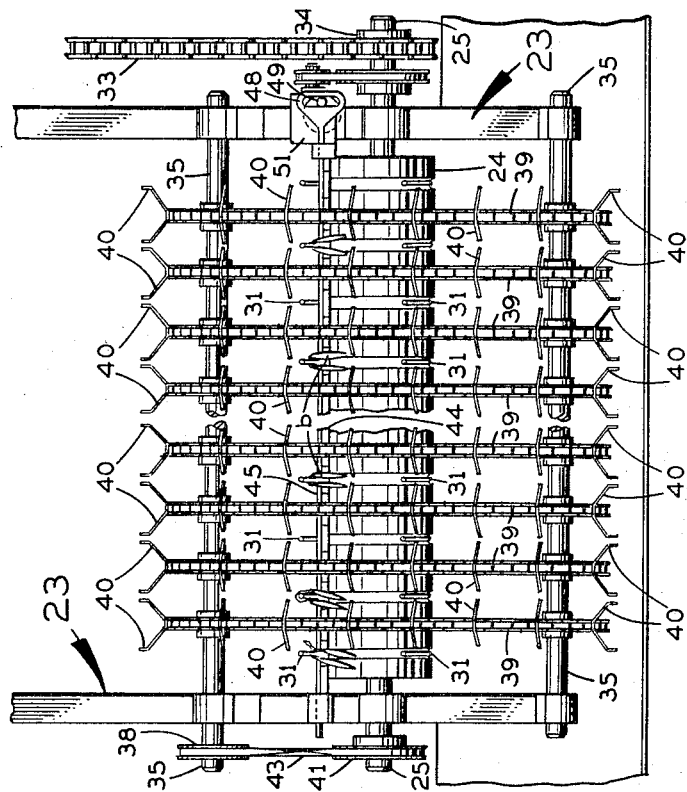
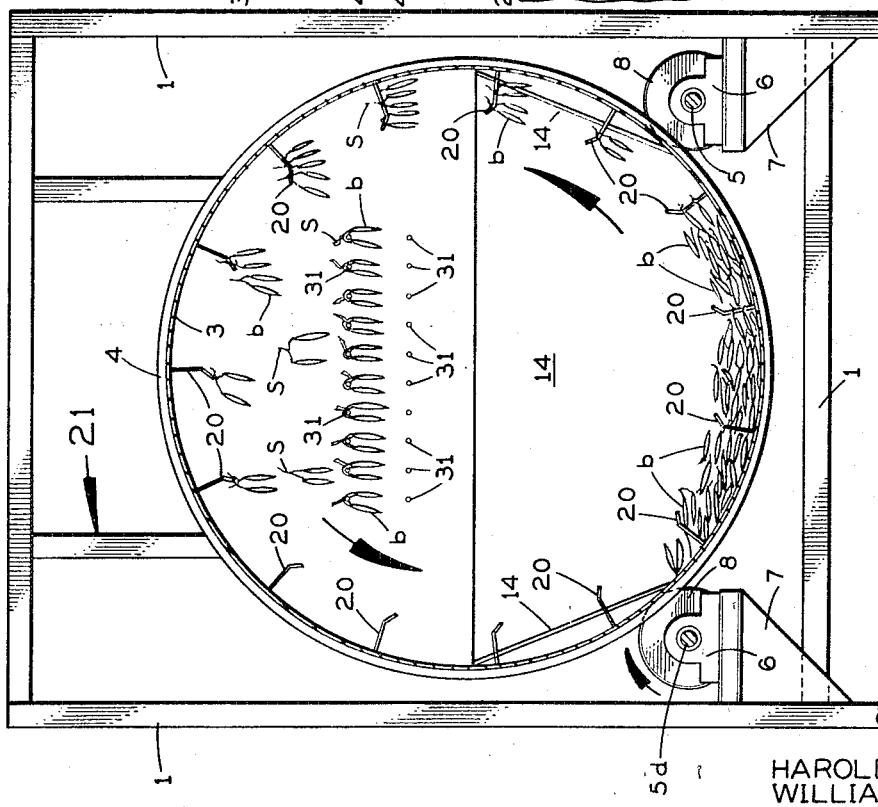
FIG. 8
FIG. 7
INVENTORS
HAROLD R. ARVE
WILLIAM T. QUEEN
BY

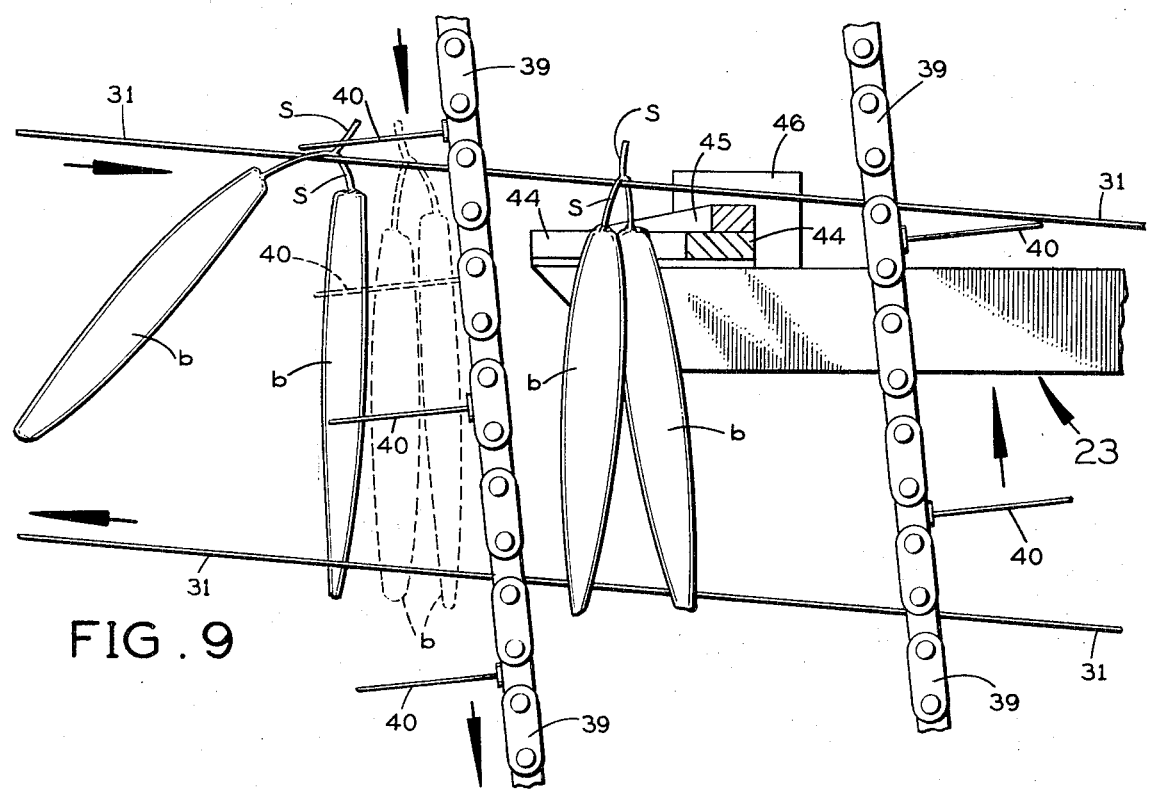
FIG. 9
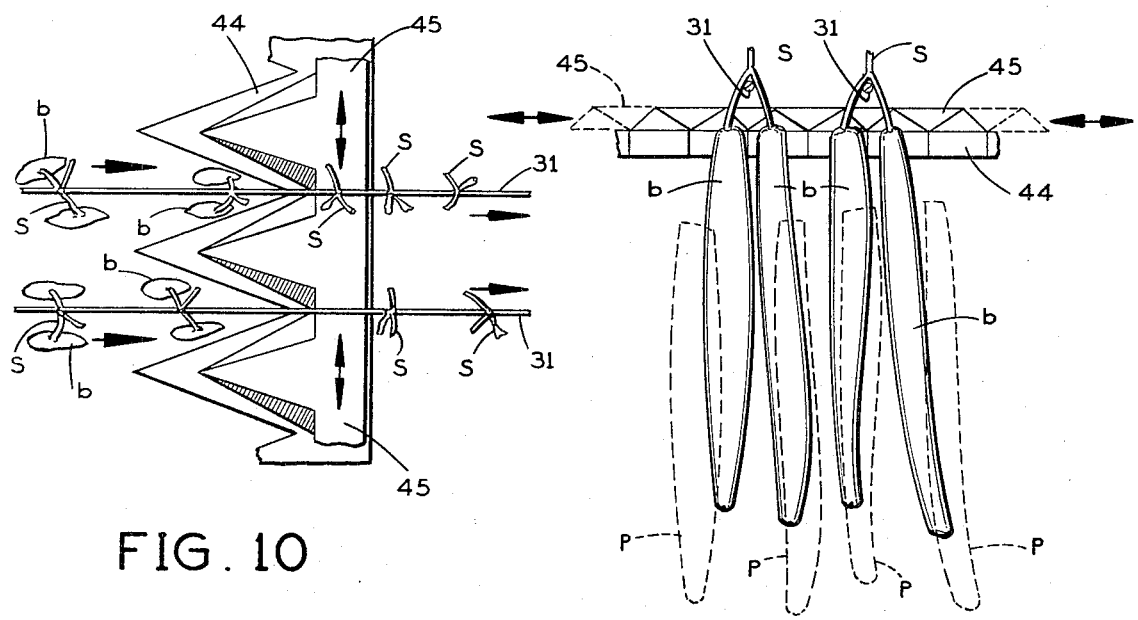
FIG. 10
FIG. 11

MACHINE FOR CUTTING STEMS FROM LEGUME PODS

This invention relates in general to agricultural machinery and more particularly to an automatic machine for cutting and separating the stems from bean pods or other edible legumes or similar agricultural products.

For the purpose of clarity, the following description will relate to the common green or wax beans, although the machine may be modified to handle stem cutting operation on a wide range of pods.

When the immature edible bean pods are field picked, the Y-shaped stem is not removed from each pair of pods, in order to extend the fresh life of the product during transit to the packer or buyer.

A principal object of the invention is the provision of a power-driven machine having a tilted rotatable drum with a chute at the high end thereof for gravity feeding a continuous flow of field-picked beans for movement along the inner surface of the drum, from which project a plurality of spaced hooks for raising the beans and dropping same with the stems straddling a multiple cable conveyor for transfer to a cutting means for cutting and separating the stems from the pods and delivering both stems and pods to separate conveyor means for transfer to separate containers.

These and other objects and advantages, in one embodiment of the invention, are described and shown in the following specification and drawings, in which:

FIG. 2 is an enlarged rear elevation of the machine shown in FIG. 1.

FIG. 3 is a front elevation of the machine shown in FIG. 1.

FIG. 7 is a cross-sectional view taken through section line 7—7, FIG. 1.

FIG. 8 is a fragmentary cross-sectional view of the machine, taken through section line 8—8, FIG. 1.

FIG. 9 is an enlarged fragmentary illustration of the elements in the machine for positioning bean pods prior to cutting the stems therefrom, shown in FIG. 6.

FIG. 10 is a fragmentary top plan view of the cutting bar assembly, shown in FIG. 5, prior to successively cutting the stems from beans fed thereto.

FIG. 11 illustrates a fragmentary side view of the cutting bar assembly, illustrating the stems as cut from the beans.

Figure 1:
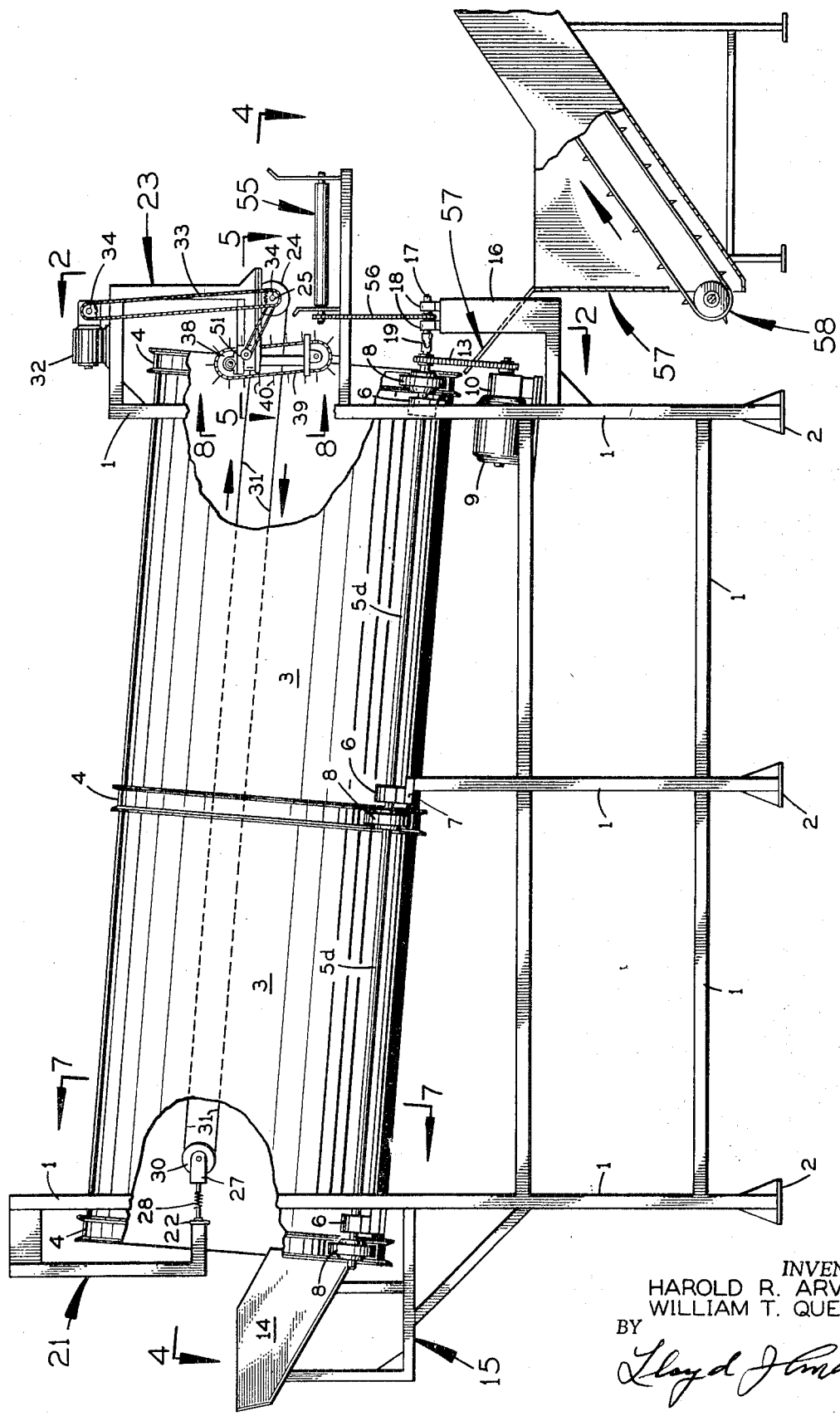
FIG. 1 is a side elevation of the machine including a fragmentary view of auxiliary conveyor means in reduced scale, with portions thereof broken away.

Referring to FIGS. 1 and 2, the working parts of the machine are retained in a generally rectangular combination frame and base 1, which is provided with six feet 2, adapted to be secured to a base or floor, not shown.

A cylindrical drum 3 having open opposite ends is supported with the axis thereof at an oblique angle, in the order of 5° from horizontal, and adapted for rotation about the axis by three circular U-shaped channels 4 secured in coaxial spaced relation about the periphery thereof, as shown.

The drum is rotated on a pair of spaced shafts 5–5d positioned in radial parallel spaced relation to the axis of the drum. Each shaft is supported for rotation by three bearings 6 secured to the frame 1 by brackets 7, best shown in FIG. 2. Three rollers 8 are secured to each shaft in engagement with corresponding channels 4.

An electric motor 9 including a speed reducer 10 is secured in frame 1 and is positioned to drive shaft 5d by means of a pair of sprockets 11 and 12 and chain 13. Thus it is apparent that the drum will rotate about its axis at a predetermined relatively slow speed when motor 9 is energized. A sheet metal input chute 14 is secured by bracket assembly 15 and extends into the inlet side of the drum for guiding the field-picked beans to be processed into the drum.

Referring to FIG. 1, an upstanding bracket means 16 secured to frame 1 has retained thereon a pair of bearings 18 which retain sprocket shaft 17, positioned to be connected by a universal joint 19 to the end of shaft 5d and rotated thereby.

Figure 4:
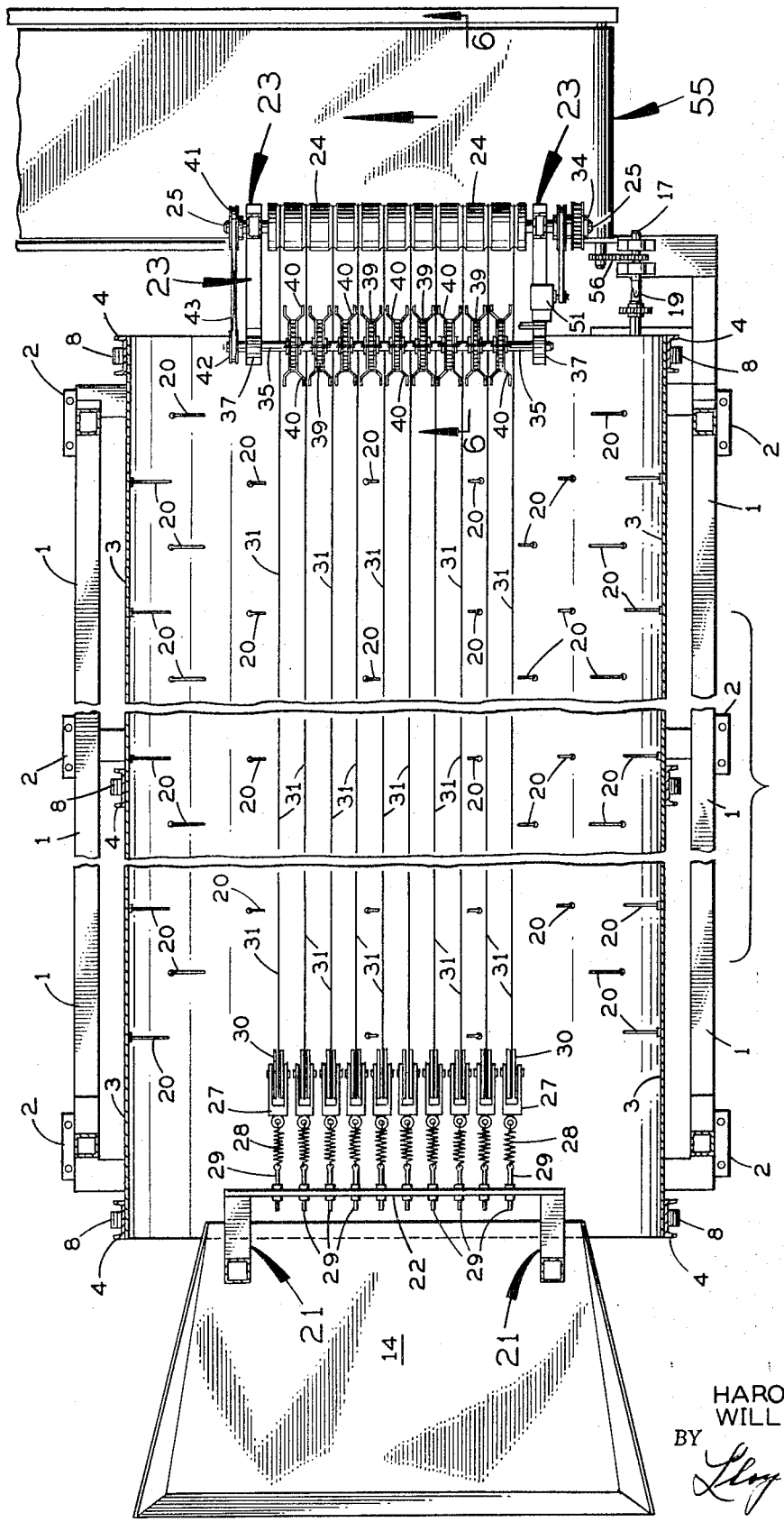
FIG. 4 is an enlarged fragmentary cross-sectional top plan view of the machine taken through section line 4—4, FIG. 1.

Referring to FIGS. 2 and 4, a plurality of fingers 20, having like offset outer end portions extending toward the direction of rotation of the drum, are secured in spaced relation in staggered rows around the entire inner surface of the drum 5, the purpose thereof to be hereinafter described.

Referring to FIGS. 1 and 4, a subframe assembly 21 is rigidly secured to frame 1 and extends downward into the high front input end of the drum 3, as shown, and terminates in a horizontal bar 22. Similarly, a subframe assembly 23 secured to frame 1 extends downward and partially into the rear exit end of the drum 3.

Referring to FIGS. 2 and 4, a cylindrical drive pulley 24, having 10 equispaced grooves therein, has a coaxial shaft 25 extending from each end thereof. Each shaft 25 is journaled in well-known bearings 26 secured on opposite sides of the subframe assembly 23, as shown.

Referring to FIGS. 1, 3, and 4, each of 10 clevises 27 is retained in equispaced relation on the bar 22 by a spring 28 and an adjustable screw eye 29 retained through the bar by well-known locknuts. Each clevis retains an idler pulley 30 journaled for rotation therein. It is to be noted that the pulleys 22 and the grooves in the drive pulley 24 correspond in spacing and are positioned in opposing relation.

An endless loop belt 31, of small diameter high-tensile metal cable such as wire, nylon, or other filament, is retained around each groove in pulley 24 and around each corresponding pulley 30, which loop belt is maintained with the upper and lower sides stretched in parallel relation, as shown, by springs 28. The upper side of each belt 31 is intended to intercept falling pairs of pods and carry same by the Y stem thereof.

Referring to FIG. 1, the 10 cable loop belts 31 are to be driven in the direction shown by arrows by a gear motor 32 secured to subframe 23 and adapted to drive pulley 24 by means of chain 33 and like sprockets 34.

Figure 5:
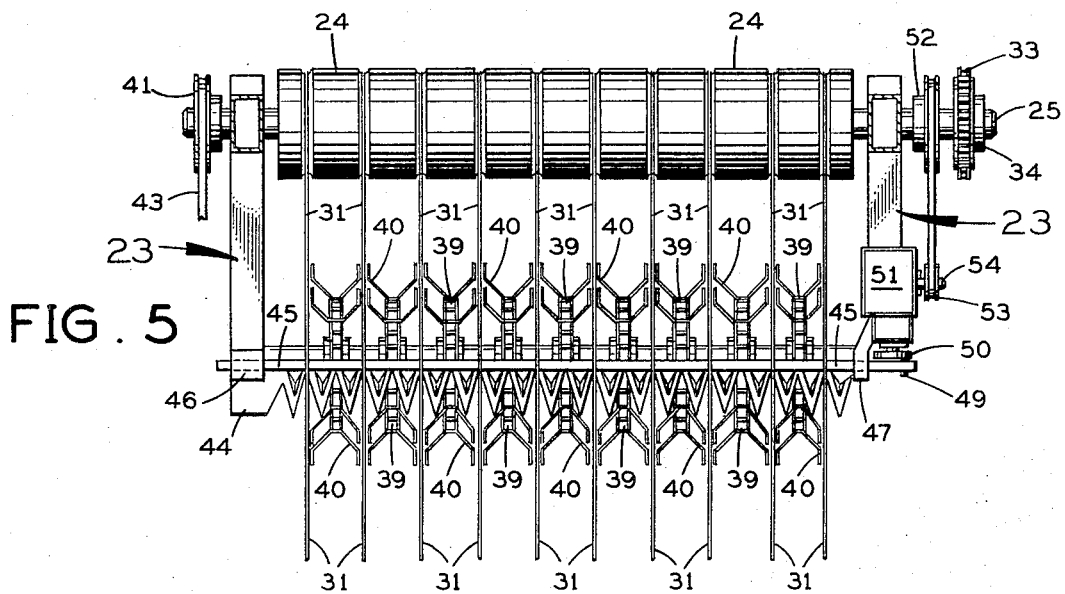
FIG. 5 is an enlarged fragmentary cross-sectional view of the machine taken through section line 5—5, FIG. 1.
Figure 6:
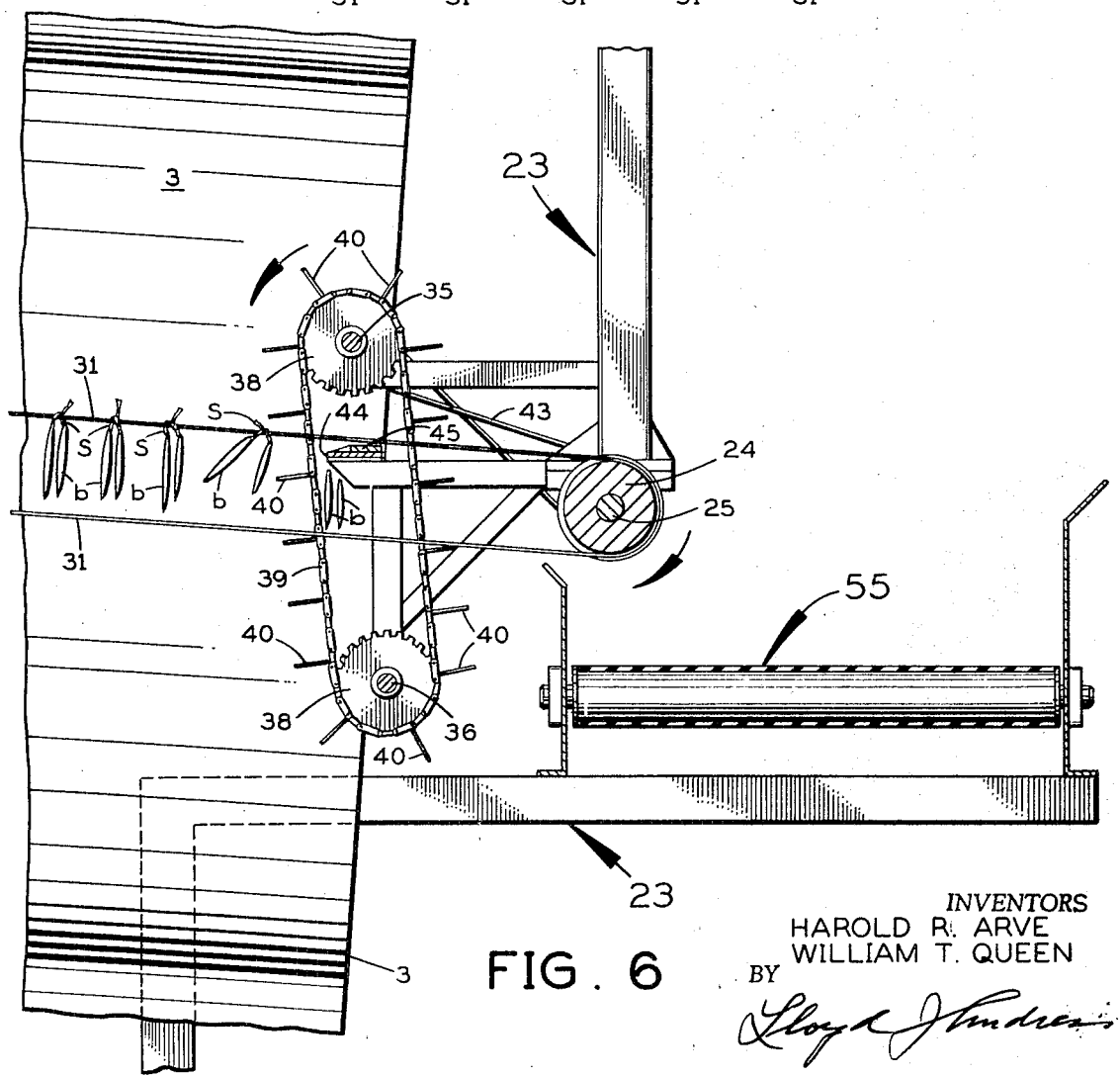
FIG. 6 is an enlarged fragmentary cross-sectional view of the machine taken through section line 6—6, FIG. 4.

Referring to FIGS. 4, 5, 6, and 9, the bean alignment assembly is secured to opposite sides of the arms 23a of the subframe assembly 23, as shown in FIG. 4, and consists of two superposed parallel shafts 35 and 36, best shown in FIG. 6, which is journaled for rotation in suitable like bearings 37—37 secured to the forward portion of opposite sides of subframe assembly 23.

Nine sprockets 38 are secured to each of the shafts 35 and 36 which are aligned in colinear relation midway between each cable 31. An endless chain 39 is secured around each vertical pair of sprockets 38, as shown in FIG. 4. Each chain is provided with 16 flexible fork-shaped alignment fingers 40 secured to and extending therefrom in equispaced relation around the chain with each finger terminating in a pair of parallel end portions, shown in FIG. 5.

A drive pulley 41 on the end portion of shaft 25 is positioned to drive a pulley 42 on shaft 35 by means of a crossed belt 43.

Referring to FIGS. 5 and 6, when the shaft 25 is rotated in the direction shown by arrow, the belt 43 will rotate shaft 35 and its sprocket 38 in a reverse direction, shown by arrow. Thus when the chain 39 moves the fingers 40 in a downward direction, the parallel portions of the fingers, which are positioned a predetermined distance from each cable 31, will engage each pair of beans and align same suspended on each wire as the bean is moved by cable 31, for reasons to be hereinafter described.

FIGS. 5 and 9 show a conventional cutter bar assembly 44 having the opposite ends thereof secured to opposite portions of the subframe 23. The fixed cutter assembly has 20 V-shaped cutting blades along its length with two blades positioned between each pair of cables 31 a predetermined adjusted small distance below the upper side of each cable. A mating movable cutter blade 45, having similar V-shaped blades along its length with the same spacing as the blades on the fixed bar, is positioned on the latter for reciprocation in guides 46 and 47. The movable cutter blade 45 is reciprocated by a yoke 48, shown in FIG. 8, driven by a crankpin 49 which in turn is driven by the output shaft member 50 of a right-angle gearbox 51, which gearbox is driven by a pulley 52 on shaft 25 and a pulley 53 on the gearbox input shaft 54.

The cuttings from the finished product are conveyed from the machine by a conventional belt conveyor assembly 55, shown in part in FIGS. 1 and 4. The conveyor is driven from shaft 17 via a pair of sprockets and chain 56. A hopper assembly 57 is positioned adjacent the lower portion of the end of the cylinder 3 for conducting the stem cut beans by gravity onto the second conventional power-driven conveyor means 58 for transfer to a predetermined destination.

In operation and when motors 9 and 32 and the conveyor 58 is operated, field-picked beans may be continuously deposited in chute 14 where they will gradually descend by the rotation of the drum toward the outlet thereof and be picked up by hooks 20 and carried to the upper side of the drum where they are gravity released to fall upon the conveyor wires 21. Certain portions of the beans will be retained by their inverted Y-shaped stems on the conveyor and be conducted rearward and properly aligned by the operation of fingers 15 and immediately following, the stems will be cut from the beans by the action of the cutter blades 44 and 45, wherein the beans will fall by gravity to and be conducted by chute 57 into the output conveyor 58. Simultaneously the stems still retained on the wire conveyor will move over pulley 24 and descend by gravity to the conveyor assembly 55 and be carried thereby to a second destination.

It is apparent that a proportion of the number of beans deposited will fall through the wire conveyor and will be again raised one or more times by hooks 21 for redrop onto the conveyor.

It has been found that a very small proportion of uncut beans will escape the outlet end of the machine.

Certain modifications to the above-described construction for conversion to handle similar agricultural products are intended to come within the scope and teachings of the invention.

Having described our invention, we claim:

1. A machine for continuously cutting the generally Y-shaped stems from legume pods comprising means forming a frame, a cylindrical drum having a predetermined diameter and length and open input and output ends with the axis thereof tilted a predetermined angle with reference to a horizontal plane with the raised end thereof forming an input end and the lower end thereof forming an output end, said drum having a coaxial channel means secured around the outer periphery of each end portion thereof, driven roller means journaled in said frame parallel to said axis and spaced a predetermined distance beneath said axis engaged with said channel means for supporting and rotating said drum in predetermined direction when driven, a source of rotating power, a transmission connecting said roller drive means and a source of rotating power for rotating said drum at a predetermined velocity, a plurality of spaced hooks projecting normal to and along a major portion of the inner peripheral surface of said drum with each of said hooks having a bent portion positioned in the said direction of rotation of said drum, a conveyor within said drum having an elongated cylindrical drive pulley of predetermined length journaled for rotation in said frame about a horizontal axis normal to the axis of said drum and positioned in said frame substantially central of and in proximity with said outlet end of said drum and said drive pulley including a predetermined number of coaxial grooves equispaced a predetermined distance along the length thereof, a number of grooved pulleys corresponding to the number of grooves in said drive pulley journaled for rotation in independent clevis means with each of said clevis means adjustably secured to said frame centrally positioned in the input end of said drum with each of said pulleys spaced for rotation corresponding with and opposite to each of said grooves in said drive pulley, an endless belt of high-tensile filament material of uniform circular cross section stretched in an elongated open loop around each groove in said drive pulley and each corresponding said pulley in said clevis forming a said like number of parallel spaced belts in horizontal spaced planar position in said drum generally central along a major portion of the length thereof with upper and lower portions of each of said belts positioned in a vertical plane, an upper alignment shaft journaled for rotation in said frame parallel with and spaced from the axis of said driven roller and positioned a predetermined distance above the said upper portion of each said belt, a drive means coupling said driven roller with said alignment shaft for rotating the latter when said driven roller is rotated, a lower alignment shaft journaled in said frame and positioned parallel with and spaced from the axis of said driven pulley, a plurality of upper sprockets secured in spaced relation on said upper shaft with each of said sprockets positioned midway between the said parallel spaced belts, a lower alignment shaft journaled for rotation in said frame in parallel spaced relation to the said axis of said driven roller, a like plurality of lower sprockets secured to said lower shaft positioned to correspond in lateral position with the said sprockets on said upper shaft, an endless chain around each said upper sprocket and each corresponding said lower sprocket with the inner side of the front facing side of each said chain positioned in close proximity to a cutter bar means, a pair of flexible fingers in spaced relation secured to and projecting normal to the outer periphery of each said chain with each finger of each said pair thereof positioned in close proximity with each of said adjacent belts for engaging and vertically aligning said pods carried forward by each of said belts for the uniform cutting of said stems therefrom when said portion of the chain facing said input is moved in a downward direction by the rotation of said upper shaft, a second source of rotating power, a transmission means connecting said drive pulley and said second source of rotating power for rotating said drive pulley and moving the said belts at a predetermined velocity with the upper sides thereof in the direction of said output portions of said drums, said cutter bar means having a lower cutting member secured in said frame a predetermined distance from and parallel the axis of said driven roller and an adjustable predetermined distance under the plane of the upper portions of said belts and having a plurality of coplanar V-shaped blades extending toward the direction of movement of said upper portions of said belts, an upper cutting member journaled for reciprocation on said lower cutting member and having a like plurality of V-blades superposed along the cutting plane of said lower blades and in the same direction, a third transmission means connecting said upper blades and said driven roller means for reciprocating said upper cutting member with respect to said lower cutting member when said driven roller is rotated whereby field-cut pods deposited in said input end of said drum will be engaged by said hooks and raised to the inner upper portion of said drum and be released for gravitation downward with each of the inverted Y-shaped stems of each pair of pods straddled along the said upper side of each of said belts with each pair of pods depending downward and carried thereby into the plane of operation of said cutter means which will cut the said stems from the pods and permit the latter to gravitate from said outlet end of said drum in a first path and permit the cut stems to continue their movement along the said belts for gravitation from the outer side of said driven roller in a second path when said sources of rotating power are operated.

* * * * *